United States Patent
Van Nieuwenhuyze (10) Patent No.: US 9,838,941 B2
(45) Date of Patent: Dec. 5, 2017

(54) NFC ROUTING METHOD

(71) Applicant: Proton World International N.V., Zaventem (BE)

(72) Inventor: Olivier Van Nieuwenhuyze, Wezembeek-Oppem (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 401 days.

(21) Appl. No.: 14/514,868

(22) Filed: Oct. 15, 2014

(65) Prior Publication Data

US 2015/0111495 A1  Apr. 23, 2015

(30) Foreign Application Priority Data

Oct. 17, 2013  (FR) ...................................... 13 60122

(51) Int. Cl.
*H04W 4/00*  (2009.01)
*H04B 5/00*  (2006.01)
*H04W 40/02*  (2009.01)

(52) U.S. Cl.
CPC .......... *H04W 40/02* (2013.01); *H04B 5/0031* (2013.01); *H04W 4/008* (2013.01); *H04B 5/0062* (2013.01); *H04B 5/0068* (2013.01)

(58) Field of Classification Search
CPC .. H04B 13/005; H04B 5/0031; H04B 5/0062; H04B 5/0068; H04W 40/02; H04W 4/008
See application file for complete search history.

(56) References Cited

U.S. PATENT DOCUMENTS

| | | | | |
|---|---|---|---|---|
| 2009/0132727 A1* | 5/2009 | Wang | ................ | H04L 12/40013 709/249 |
| 2010/0011139 A1* | 1/2010 | Wang | .................... | H04L 12/403 710/110 |
| 2012/0069772 A1* | 3/2012 | Byrne | ................... | H04W 76/02 370/255 |
| 2012/0137310 A1* | 5/2012 | Teruyama | ............... | H04W 4/00 719/320 |
| 2013/0040565 A1* | 2/2013 | Suzuki | ..................... | H04B 5/00 455/41.1 |
| 2013/0084803 A1* | 4/2013 | Hall | .................. | H04W 52/0277 455/41.1 |

(Continued)

FOREIGN PATENT DOCUMENTS

| | | |
|---|---|---|
| EP | 2 432 277 A1 | 3/2012 |
| EP | 2 458 899 A1 | 5/2012 |
| WO | 2013/133058 A1 | 9/2013 |

*Primary Examiner* — Lewis West
(74) *Attorney, Agent, or Firm* — Seed IP Law Group LLP (57) ABSTRACT

A near field communication (NFC) router of a mobile device receives a first message from an external NFC device and, in accordance with a first active rule, processes the first message as being targeted to a first host processing device of the mobile device. When the NFC router receives a second message from the external NFC device and detects a bit pattern in the second message indicating that the first host processing device is not an intended target of the second message, the NFC router activates a second rule. When the NFC router receives a further first message from the external NFC device, the NFC router processes the further first message as being targeted to a target host processing device in accordance with the second active rule.

26 Claims, 4 Drawing Sheets

(56) References Cited

U.S. PATENT DOCUMENTS

| | | | |
|---|---|---|---|
| 2013/0231130 A1* | 9/2013 | Cherian | H04W 4/025 455/456.1 |
| 2014/0201815 A1* | 7/2014 | Van Nieuwenhuyze | G06F 21/6209 726/4 |
| 2015/0033289 A1* | 1/2015 | Caceres | H04W 12/08 726/3 |
| 2015/0038077 A1* | 2/2015 | Suzuki | G06Q 20/3278 455/41.1 |

* cited by examiner

| RF | INDEX | PATTERN | MASK | PWR | RULE SET | TARGET | DISABLE RULE | ROUTING ACTIVE | |
|---|---|---|---|---|---|---|---|---|---|
| A | 1 | 5A000000 | FFFFFFFF | 1 | 0x01 | UICC | | 1 | ~702 |
| A | 1 | 5A000000 | FFFFFFFF | 1 | 0xXX | eSE | | 1 | ~704 |
| A | 1 | 5A000001 | FFFFFFFF | 1 | 0x01 | UICC | | 1 | ~706 |
| A | 1 | 5AXXXXXX | FF000000 | 1 | 0x01 | UICC | 0x01 | 1 | ~708 |
| A | 1 | 5A000002 | FFFFFFFF | 1 | 0xXX | eSE | | 1 | ~710 |

NFC ROUTING METHOD

BACKGROUND

Technical Field

The present disclosure relates to the field of NFC communications, and in particular to a method of routing, in a mobile device, NFC messages from an external NFC device to a target host.

Description of the Related Art

Mobile telephones and other types of mobile devices are increasingly being equipped with NFC (Near-Field-Communication) interfaces, which enable them to perform electromagnetic transponder functions in addition to their other functions. In particular, such devices are able to emulate the functions of an electromagnetic transponder, which could be of the contactless card type, or the contactless reader type. Such functionality for example enhances the mobile device, by allowing it to be used for various applications, for example as an electronic wallet allowing payments to be made for accessing services such as transport networks.

To emulate the operation of a contactless card, the mobile device is generally equipped with a contactless front-end integrated circuit (CLF), also called an NFC router. This router is equipped with a radio frequency (RF) transceiver front-end coupled to a low-range antenna to match the communication capabilities of an electromagnetic transponder. In some applications, a secure element, either integrated in the mobile device or contained in a micro-circuit of the subscriber identification module (SIM) or universal SIM, can be used to provide authentication.

NFC communications using a mobile device generally fall within one of three main modes of operation: tag emulation, in which the behavior of a certain type of wireless transponder is emulated by the mobile device; peer-to-peer communications, also referred to as P2P, in which bilateral communications are provided between the mobile device and another device; and reader/writer mode, also referred to as PCD (proximity coupling device), in which the mobile device reads tags by emitting an electromagnetic field.

BRIEF SUMMARY

The inventors have realized that a technical problem exists in permitting certain types of tag emulation modes to be distinguished from others and routed to the correct target host of the mobile device, rendering it difficult or in some cases impossible to establish NFC communications.

In an embodiment, a method of processing, by a near field communication router of a mobile device, messages to a target host processing device of the mobile device, comprises: receiving by the NFC router a first message from an external NFC device and, in accordance with a first active rule, processing the first message as being targeted to a first host processing device of the mobile device; receiving by the NFC router a second message from the external NFC device; detecting by the NFC router a bit pattern in the second message indicating that the first host processing device is not an intended target of the further message and activating in consequence a second rule; and receiving by the NFC router a further first message from the external NFC device, and in accordance with the second active rule, processing the further first message as being targeted to the target host processing device.

In an embodiment, activating the second rule comprises storing in a memory an indication that the second rule is active or that the first rule is deactivated.

In an embodiment, the method further comprises accessing by the NFC router, in response to receiving the first message, a lookup table identifying, based on at least some of the data bits forming the first message and on whether the first or second rule is active, the first host processing device.

In an embodiment, the method further comprises accessing by the NFC router, in response to receiving the further first message, the lookup table, wherein the lookup table further identifies, based on at least some of the data bits forming the further first message and on whether the first or second rule is active, the target host processing device.

In an embodiment, the method further comprises transmitting by the NFC router, in response to the first message, a response message to the external device.

In an embodiment, the response message comprises an identifier of the first host processing device, and the bit pattern is the combination in the second message of at least part of the identifier of the first host processing device and of one or more bits indicating an NFC application type incompatible with the first host processing device.

In an embodiment, the method further comprises receiving via the NFC router a further second message from the external NFC device and in accordance with the second active rule, routing the further second message to the target host processing device.

In an embodiment, the method further comprises, prior to receiving the further second message, transmitting by the NFC router, in response to the further first message, a further response message to the external device, the further response message comprising an identifier of the target host processing device, wherein the further second message comprises the identifier of the target host processing device.

In an embodiment, the target host processing device is a secure element of the mobile device.

In an embodiment, the target host processing device emulates the behavior of a contactless integrated circuit card.

In an embodiment, the first message and the further first message are polling messages of NFC RF transmission type F.

In an embodiment, a mobile device comprises: a plurality of host processing devices; and a near field communication router adapted to: receive a first message from an external NFC device and, in accordance with a first active rule, process the first message as being targeted to a first processing device of the mobile device; receive a second message from the external NFC device; detect a bit pattern in the second message indicating that the first host processing device is not an intended target of the further message and activate in consequence a second rule; and receive by the NFC router a further first message from the external NFC device, and in accordance with the second active rule, process the further first message as being targeted to the target host processing device.

In an embodiment, the target host processing device is a secure element of the mobile device.

In an embodiment, the target host processing device is a SIM (subscriber identification module) circuit or a universal SIM of the mobile device.

In an embodiment, the mobile device further comprises a memory storing a lookup table, wherein the lookup table designates, based on at least some of the bits forming each of the first messages and on whether the first or second rule is active, the first host processing device or the target host processing device.

In an embodiment, a device comprises: one or more memories; and processing circuitry, which, in operation:

responds to a first near field communication (NFC) message from an external NFC device by identifying a processing device of a plurality of processing devices and processing the first NFC message based on the identified processing device of the plurality of processing devices; determines, based on bits of a second NFC message received from the external NFC device, whether the second NFC message was directed to the identified processing device; and when it is determined that the second NFC message was not directed to the identified processing device of the plurality of processing devices, responds to a third RFC message by identifying a second processing device of the plurality of processing devices and processing the third NFC message received from the external NFC device based on the second identified processing device. In an embodiment, the device comprises an NFC router including the processing circuitry. In an embodiment, the memory stores a look-up table and the processing circuitry, in operation, identifies processing devices of the plurality of processing devices and determines whether the second NFC message was directed to the identified processing device based on the look-up table. In an embodiment, the first and third NFC messages received from the external NFC device are NFC polling messages. In an embodiment, the plurality of processing devices comprise a host processor of a mobile device and at least one secure element of the mobile device.

In an embodiment, a system, comprises: a plurality of processing devices; and a near field communication router, which, in operation: responds to a first near field communication (NFC) message from an external NFC device by identifying a processing device of the plurality of processing devices and processing the first NFC message based on the identified processing device of the plurality of processing devices; determines, based on bits of a second NFC message received from the external NFC device, whether the second NFC message was directed to the identified processing device; and responds to a third NFC message received from the external NFC device based on the determination. In an embodiment, the system comprises a memory storing a look-up table, wherein the NFR router, in operation, determines whether the second NFC message was directed to the identified processing device based on the look-up table. In an embodiment, the first and third NFC messages received from the external NFC device are NFC polling messages. In an embodiment, the plurality of processing devices comprise a host processor of a mobile device and at least one secure element of the mobile device. In an embodiment, when it is determined that the second NFC message was not directed to the identified processing device of the plurality of processing devices, the NFC router, in operation, identifies a second processing device of the plurality of processing devices and processes the third NFC message based on second identified processing device of the plurality of processing devices. In an embodiment, the NFC router, in operation, responds to the first NFC message received from the external NFC device by applying a first processing rule, and, when it is determined that the second NFC message received from the external NFC device was not directed to the identified processing device, responds to the third NFC message received from the external NFC device without applying the first processing rule.

In an embodiment, a non-transitory computer-readable memory medium's contents cause a near field communication router to perform a method, the method comprising: responding to a first near field communication (NFC) message from an external NFC device by identifying a processing device of a plurality of processing devices and processing the first NFC message based on the identified processing device of the plurality of processing devices; determining, based on bits of a second NFC message received from the external NFC device, whether the second NFC message was directed to the identified processing device; and responding to a third NFC message received from the external NFC device based on the determination. In an embodiment, the determining whether the second NFC message was directed to the identified processing device is based on a look-up table. In an embodiment, when it is determined that the second NFC message was not directed to the identified processing device of the plurality of processing devices, the method comprises identifying a second processing device of the plurality of processing devices and processing the third NFC message based on second identified processing device of the plurality of processing devices. In an embodiment, the method comprises responding to the first NFC message received from the external NFC device by applying a first processing rule, and, when it is determined that the second NFC message received from the external NFC device was not directed to the identified processing device, responding to the third NFC message received from the external NFC device without applying the first processing rule.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, integrated circuits, receivers, antennas, processors, logic gates, discrete circuitry, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
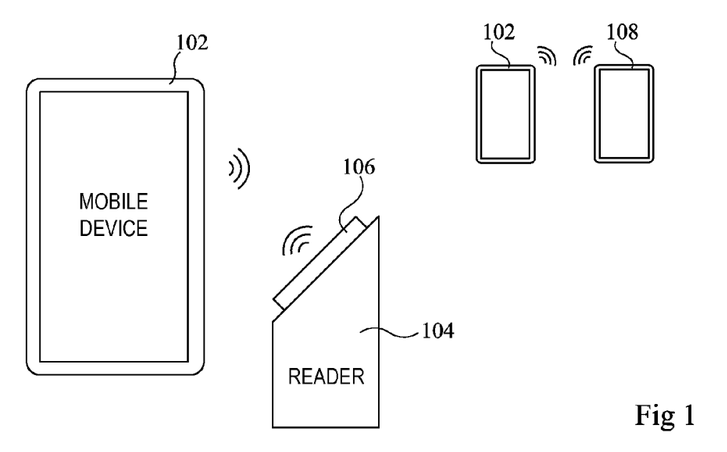
FIG. 1 schematically illustrates an example of a mobile device capable of NFC communication according to an example embodiment of the present disclosure.

FIG. 1 schematically illustrates a mobile device 102 capable of NFC communications. For example, the mobile device 102 is a mobile telephone, smart phone, tablet computer, digital media player or the like, equipped with NFC circuitry (not illustrated in FIG. 1).

On the left-hand side in FIG. 1, the mobile device 102 is shown in communication with a reader 104, comprising an NFC transponder 106. For example, the reader 104 is positioned at an entry barrier of a restricted area, such as a transport network or the like. Alternatively, the reader 104 is positioned at a point of sale in a shop or restaurant. When used with such a reader, the NFC circuitry of the mobile device 102 for example operates in a tag emulation mode.

On the right-hand side in FIG. 1, the mobile device 102 is shown in communication with another mobile device 108 via an NFC interface. For example, like mobile device 102, the mobile device 108 is a mobile telephone, smart phone, tablet computer, digital media player or the like, equipped with NFC circuitry. When communicating with another mobile device, the NFC circuitry of the mobile device 102 for example operates in a peer-to-peer mode, and communications are initiated by either one of the mobile devices.

Figure 2:
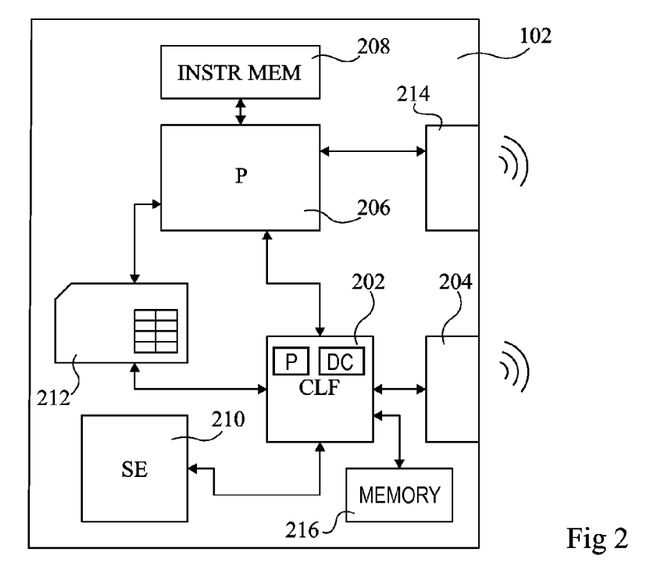
FIG. 2 schematically illustrates a mobile device of FIG. 1 in more detail according to an example embodiment of the present disclosure.

FIG. 2 schematically illustrates the mobile device 102 in more detail according to an example embodiment.

As illustrated, the device 102 for example comprises a contactless front-end integrated circuit (CLF) 202, which will be referred to herein as an NFC router. The NFC router 202 is coupled to an NFC antenna 204, and together the router 202 and antenna 204 provide NFC circuitry for emulating the behavior of an NFC transponder. The NFC router 202 includes processing circuitry, which as illustrated comprise a processor P and discrete circuitry DC (e.g., logic gates, comparators, etc.), which in operation perform the various functions of NFC router 202.

The NFC router 202 is also for example coupled to a host processing device (P) 206 of the mobile device 102, which will be referred to herein as the device host. The device host 206 for example comprises one or more processors under the control of instructions stored in an instruction memory (INSTR MEM) 208. The NFC router 202 is also for example coupled to other host processing devices, of which a secure element (SE) 210, which is for example an embedded SE (eSE), and/or a SIM or universal SIM circuit 212, are illustrated. The circuit 212 is for example additionally coupled to the device host 206.

The device host 206 is also for example coupled to an antenna 214, which for example permits telecommunications within a cellular network.

A memory 216 is for example coupled to the NFC router 202, and stores a routing table, described in more detail below, defining rules for processing NFC messages received by the NFC router. In particular, the messages may be considered to be targeted to either the device host 206 or one of the secure elements 210, 212. In some embodiments, the memory 216 could be integrated with the NFC router 202. In some embodiments, the memory 216 may store instructions, which when executed by the processor P of the NFC router 202, facilitate performance of various functions of the NFC router 202.

In some cases, when NFC communications are to be established with the mobile device 102 by an external device such as the reader 104 or the mobile device 108 of FIG. 1, a polling message is first transmitted by the external device, and received by the NFC router 202.

Figure 3:
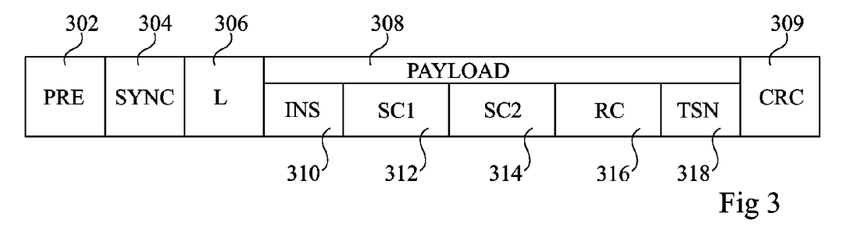
FIG. 3 schematically represents a data packet of an NFC message according to an example embodiment of the present disclosure.

FIG. 3 illustrates an example of the format of a data packet of an NFC message according to the NFC standard ISO/IEC 18092.

As illustrated, the data packet for example comprises a preamble (PRE) 302, which is for example 38 bits or more in length, a synchronization field (SYNC) 304, which is for example 6 bits in length, a length field (L) 306, which is for example 8 bits and indicates the total length of frame, a payload (PAYLOAD) 308, and a cyclic redundancy code field (CRC) 309. The payload 308 for example includes sub-fields comprising an instruction code (INS) 310, and one or more data fields. FIG. 3 illustrates the case of a polling message, in which the data fields comprise two system code fields (SC1, SC2) 312 and 314, which are for selecting a specific application, a request code field (RC) 316 used to request additional information, and a time slot number TSN 318 used for anti-collision purposes.

In the case of a polling message, the instruction code INS 310 is for example equal to 0x00, and the fields 312 and 314 are by default each at the value 0xFF. Throughout the present description, the prefix "0x" is used to indicate that each following character corresponds to a hexadecimal value.

Figure 4:
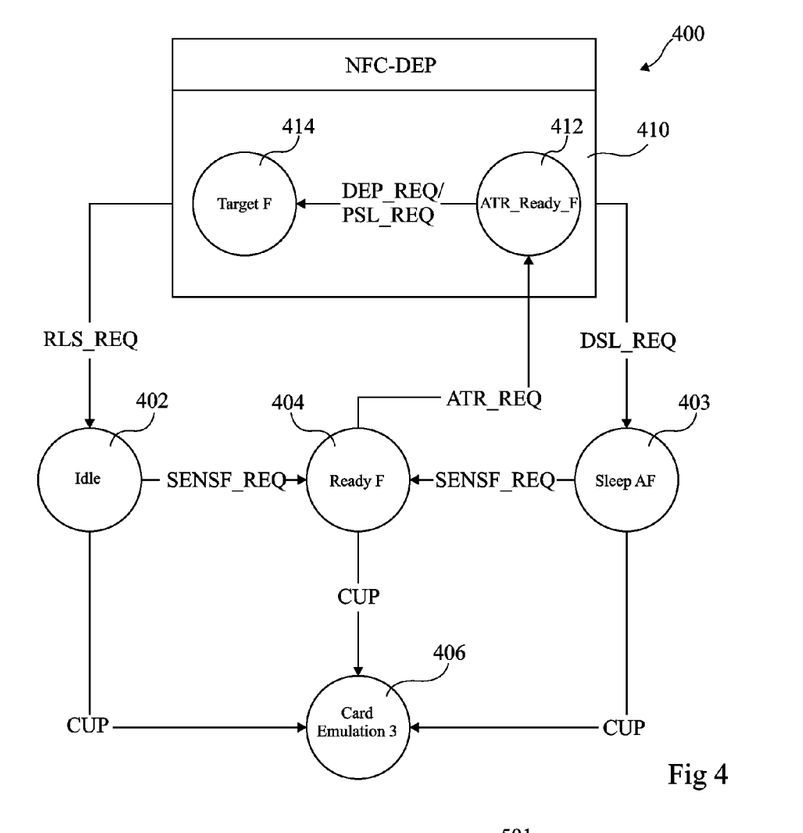
FIG. 4 is a state diagram representing an example of operation of the NFC circuitry of the mobile device of FIG. 2 according to an example embodiment of the present disclosure.

FIG. 4 is a state diagram 400 representing operation of NFC circuitry of a mobile device in accordance with the NFC forum.

From an idle state "Idle" 402 or sleep state "Sleep AF" 403, when a polling message (labelled "SENSF_REQ" in FIG. 4) is received, there is a state transition to a ready state "Ready F" 404. In general, a polling message received and processed by the NFC router for example permits a Peer-to-Peer or NFC-Forum tag type 1, 2, 3 or 4 to be polled. The message "SENSF_REQ" corresponds to a peer-to-peer or NFC-Forum tag type 3 polling message. The NFC-Forum tag type 3 protocol, referred to hereafter simply as "type 3", is also known as FeliCa ("FeliCa" may correspond to a registered trademark) and is based on Japanese Industrial Standard (WS) X 6319-4. A Peer-to-Peer or type 3 polling message for example comprises a data packet having the format shown in FIG. 3, and the instruction code INS in field 310 equal to 8 bits with the value 0x00. Unless the application code values SC1, SC2 in fields 312, 314 specify directly a certain target host processing device of the mobile device 102, such as the secure element 210 or SIM 212, polling messages are assumed by default to be targeted to the host device 206, and in response a return packet is generated to the external device including in its payload an NFC identifier of the device host 206.

From state 404, if a check/update command (CUP) message is the subsequent message to be received by the NFC router from the external device, the next state is a Type 3 Card Emulation mode 406, in which the behavior of a contactless card of the FeliCa type is emulated. The CUP message includes the NFC identifier previously communicated to the external device. The state 406 may also be entered directly from the idle or sleep states 402, 403 upon reception of the CUP message if it contains the appropriate identifier of the card emulation device.

Alternatively, if from state 404 the next message is one labelled "ATR_REQ" in FIG. 4 corresponding to a peer-to-peer message of ISO 18092, a peer-to-peer mode 410 is entered, also known as the NFC-DEP mode. Such a message comprises a specific instruction code INS having the format 0x0X, wherein X is any hexadecimal value. An "ATR_Ready_F" state 412 is then entered, and after that a message comprising a data transfer instruction code DEP_REQ, or an instruction code PSL_REQ for allowing the NFC-DEP speed to be changed, received from the external device, may cause a "target F" state 414 to be entered. From either of the states 412 or 414 of the peer-to-peer mode 410, a disable request message "DSL_REQ" from the external device will for example return the mobile device 102 to the Sleep state 403, and a release request message "RLS_REQ" from the external device will for example return the mobile device 102 to the idle state 402.

A problem is that in practice it may be difficult or impossible to successfully enter the card emulation state 406. Indeed, the NFC router 202 is coupled to multiple host devices of the mobile device 102, each of which is potentially the target host for the NFC communications. For example, in the case of messages of the peer-to-peer type, the target is the device host 206 of the mobile device 102, whereas for type 3 tag emulation, the target is for example the secure element 210. However, it is not always possible for the NFC router 202 to identify which host is the target host directly from the polling message. Furthermore, the external reader is generally not compatible with the detection of more than one host at a time, meaning that the target host can not be changed during a given NFC message sequence. Further still, there is not time to interrogate each host to check whether it is the intended target, as for RF technology type F communications, the NFC router 202 generally should respond within only 2.4 ms. Therefore, unless the system code fields SC1 and SC2 of the polling message indicate a specific application, and thus a specific target element, messages are for example processed by default as being targeted to the device host 206 of the mobile device. Thus an NFC-Forum Tag Type 3 polling message that does not designate a specific application will be routed to the device host 206 of the mobile device 102, and the response transmitted to the external device will comprise an NFC identifier associated with the host processing device 206. The subsequent CUP message will thus include the identifier of the host processing device, and it will be routed to the device host. However, as it does not correspond to a peer-to-peer message having an instruction code of the form 0xDX, the device host will discard this message, and return to the idle state 402. In the absence of a response, the external device may retransmit the CUP message. However, as the identifier used in the CUP message would still be that of the device host, this message will also be discarded. Furthermore, a new polling message sent by the external device will result in exactly the same sequence of events, meaning that the card emulation mode in practice can not be entered.

Figure 5:
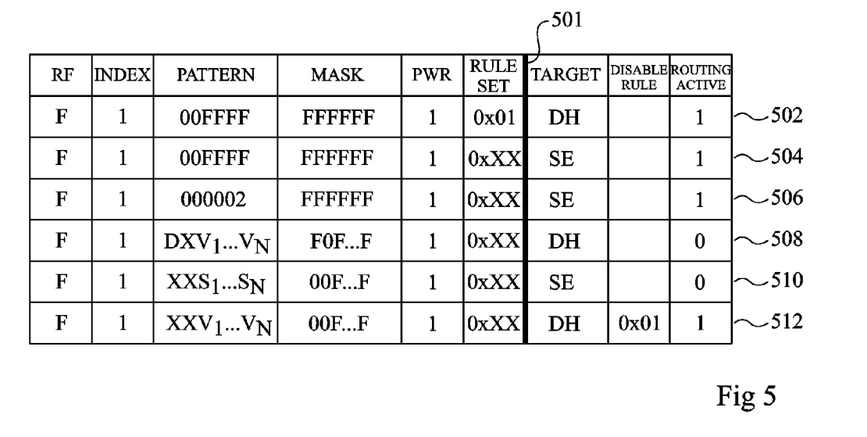
FIG. 5 is a table illustrating routing rules according to an example embodiment of the present disclosure.

FIG. 5 is a table showing an example of routing rules that are applied by the NFC router according to at least some embodiments of the present disclosure. As indicated above, such a table is for example stored in the memory 216. In one embodiment, the table can be implemented as a look-up table (LUT).

The table comprises a number of columns to the left of a dividing line 501 that correspond to input conditions. These columns include: an RF technology column (RF) indicating the NFC RF technology of the communication; a number of columns defining certain bits of a received message, these columns including an index column (INDEX) indicating a byte of the message to be considered, a pattern column (PATTERN), defining certain patterns of bits of the payload, and a mask column (MASK) indicating the bits of the payload that are to be taken into account; a power field (PWR) initiating whether the device is switched ON, switched OFF or its battery is OFF; and a rule set field (RULE SET) indicating which of a plurality of rule sets is active.

According to the example of FIG. 5, the table comprises six rows 502 to 512. In order to select one of the rows, the rows are considered in turn from the top down, in other words from row 502 to 512. The selected row is the first row for which all of the input conditions are met.

The table also comprises a number of columns to the right of the dividing line 501 indicating actions to be taken for a selected row of the table. A target column (TARGET) indicates how the message is to be processed. In the example of FIG. 4, this column indicates whether the messages are to be processed as being targeted to the device host (DH), for example the device 206 of FIG. 2, or to the secure element (SE), for example the element 210 or 212 in FIG. 2. A disable rule column (DISABLE RULE) indicates which rule set, if any, is to be disabled, and a routing active column (ROUTING ACTIVE) indicates whether or not the routing table is to be applied for a subsequent message that is received.

The RF column for example indicates the RF technology type F, and the index column for example designates an index "1" for each row 502 to 512, meaning that the a byte "1" of each message is to be considered. Furthermore, the power column for example indicates a value "1" for each of the rows 502 to 512, meaning for example that the mobile device is switched ON. For example, in the case that the mobile device is switched off, a peer-to-peer operation is not permitted, and by default polling messages may be treated as messages of NFC-Forum Tag Type 3.

The patterns defined in the table of FIG. 5 for example correspond to the bits of the NFC message forming the payload, and in particular the fields 310, 312 and 314 of FIG. 3. The pattern in rows 502 and 504 of the table is for example hexadecimal "00FFFF", which corresponds to a peer-to-peer or NFC-Forum Tag Type 3 polling message, and the mask in rows 502 and 504 is equal to hexadecimal "FFFFFF", indicating that all of the bits of the pattern are to be taken into account. The pattern in row 506 is hexadecimal "000002", which for example corresponds to an NFC-Forum Tag Type 3 polling message in which an application 0x02 is selected directly, and the mask in row 506 is hexadecimal "FFFFFF". The pattern in row 508 is hexadecimal "DXV$_1$ . . . V$_N$", X being any value, and V$_1$ to V$_N$ the N hexadecimal values of an identifier associated with the device host, and the mask in row 508 is hexadecimal "F0F . . . F", indicating that the second hexadecimal value of the pattern is not taken into account. The pattern in row 510 is hexadecimal "XXS$_1$ . . . S$_N$", where S$_1$ to S$_N$ are the N hexadecimal values associated with the secure element, and the mask in row 510 is hexadecimal "00F . . . F", indicating that the first byte of the pattern is not to be taken into account. The pattern of row 512 is hexadecimal "XXV$_1$ . . . V$_N$", and the mask is hexadecimal "00F . . . F".

In row 502, the rule set column indicates that rule set 0x01 is active, whereas the remaining rows have 0xXX, indicating that any rule set may be active. While the rule set is designated by 8 bits in the example of FIG. 5, other coding schemes could be employed using a different number of bits or bytes.

Figure 6:
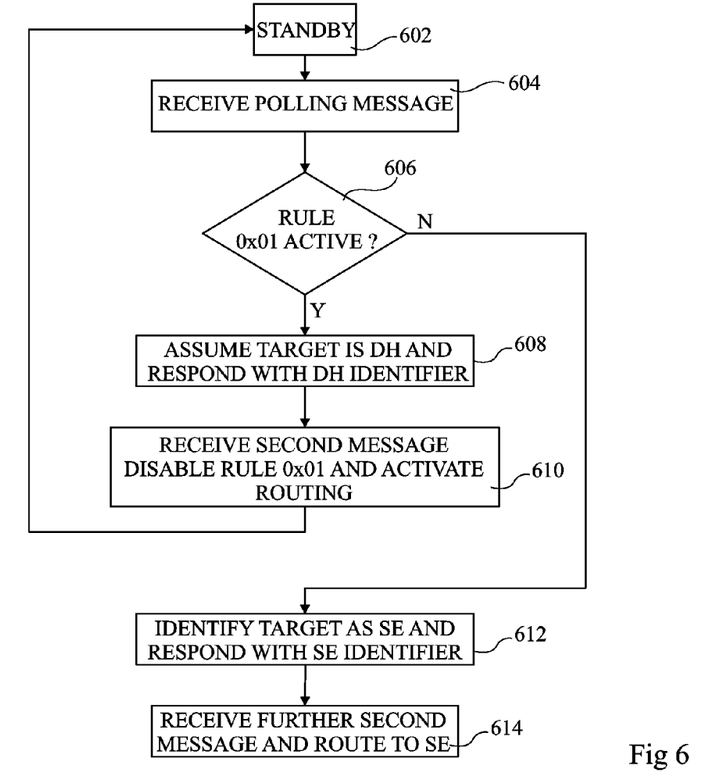
FIG. 6 is a flow diagram illustrating steps in a method of routing messages according to an example embodiment of the present disclosure.

FIG. 6 is a flow diagram illustrating steps in a method of routing messages by the NFC router 202 of the mobile device 102 of FIG. 2 according to an example embodiment in which it is assumed that the messages are of NFC-Forum Tag Type 3 intended for example for the secure element 210 of the mobile device.

As shown in FIG. 6, initially the mobile device is in a standby state 602, which could correspond to the idle state 402 or sleep state 403 of FIG. 4.

A polling message is then received from an external device in a step 604, which for example corresponds to the message "SENSF_REQ", and the mobile device 102 passes to the "Ready F" state 404 of FIG. 4.

In a subsequent step 606, the routing table as defined in FIG. 5 is used in order to determine the target host to be associated with the polling message. In FIG. 6, it is assumed that the message has an instruction code INS equal to 0x00, and that the remaining bits are all at logic "1", implying that no specific application is selected. Thus either the first row 502 or the second row 504 of the table will be selected based on the rule set that is active, and in step 606 it is determined whether or not the rule set 0x01 is active. The active rule set is for example stored in the memory 216 of FIG. 2, or in a dedicated register of the NFC router. In the table of FIG. 5, the rule set 0x01 is a default rule set that is systematically applied, for example following power-up of the NFC router, or if there has been no NFC communication for a certain time period, such as several minutes. Thus assuming that initially the rule set 0x01 is active corresponding to row 502 of the table, the next step after step 606 is step 608.

In step 608, the polling message is processed as being targeted to the device host 206 in accordance with the target DH indicated in row 502 of the table, and application of the routing table is activated for a subsequent message. In some embodiments, the NFC router 202 responds directly to the polling message by transmitting a return message to the external device including the identifier of the device host 206 associated with peer-to-peer communications, which will be called herein NFC-DEP_NFCID2 and assumed to comprise N values $V_1$ to $V_N$. Alternatively, in some embodiments, for example if the default host is not the device host and is coupled to the NFC router by a relatively fast interface, the polling message may be routed to this host, which then generates the return message to the external device, which is transmitted via the NFC router.

In a subsequent step 610, a further message is received, which is for example the CUP message as defined by the FeliCa standard. Routing being active, the table of FIG. 5 will be applied again to determine how to process this message. The CUP message starts with an instruction code INS not equal to 0xD0, which is reserved for peer-to-peer. It also includes at least part of the identifier NFC-DEP_NFCID2 associated with the host processing device, labelled as the N hexadecimal values $V_1$ to $V_N$ in the table. Thus the selected row will be the row 512 of the table, and the message will be routed to the device host 206. However, given that the instruction code will be incompatible with the device host 206, the message will be discarded. Furthermore, in accordance with row 512 of the table, the rule set 0x01 is disabled. For example, the rule set parameter is set to 0x00 indicating that there is no active rule set, or it is set to another value such as 0x02, indicating that another rule set is active. In any case, the difference will be that, rather than selecting the row 502 of the table, the row 504 will be selected, and thus a different routing rule will be applied. Furthermore, routing is activated for a subsequent message. The flow then returns to the standby state 602.

A new polling message is then received from the external device in step 604, and again the table is consulted. This time, the rule 0x01 has been disabled, as so the second row 504 of the table will be selected, and the next step is 612.

In step 612, the message is processed as being targeted to the secure element in accordance with row 504 of the table, and application of the routing table is activated for a subsequent message. In this case, the polling message is for example routed to the secure element 210, and this secure element thus responds with its identifier, which will be called herein SE_NFCID2, and assumed to comprise N values $S_1$ to $S_N$.

In the subsequent step 614, a further message is received, which is for example the CUP message as defined by the FeliCa standard. Routing being active, the table will be applied again, and this time row 510 of the table will be selected, given that the identifier is now the hexadecimal value $S_1 \ldots S_N$. NFC communications are thus successfully established between the secure element and the external device.

Row 508 of the table corresponds to the case that the NFC peer-to-peer communication mode is to be used, and thus following the polling message, a message of the form $0xDXV_1 \ldots V_N$ is received from the external device. Peer-to-peer communications can then proceed correctly between the device host 206 and the external device.

While the embodiment of FIGS. 4, 5 and 6 described above concerns conflicts between NFC peer-to-peer and NFC-Forum Tag Type 3 communications, the principles described in relation to that embodiment could be applied to a broad range of alternative applications and RF technologies. An example of such an alternative application will now be described with reference to FIG. 7.

Figure 7:
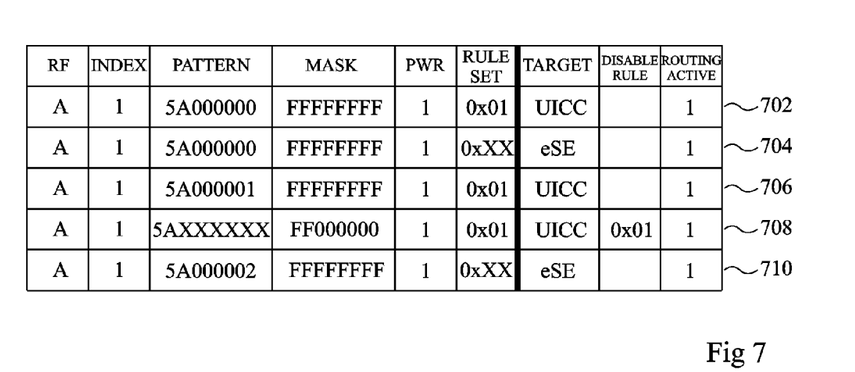
FIG. 7 is a table illustrating routing rules according to a further example embodiment of the present disclosure.

FIG. 7 is a routing table similar to the one of FIG. 5, but corresponds to an application in which the behavior of a MIFARE DESFire contactless card is to emulated by the mobile device 102 (the terms MIFARE and DESFire may correspond to registered trademarks). In such an application, the messages received by the NFC router 202 are for example of RF technology type A, the device host 206 is referred to as a universal integrated circuit card (UICC), and an embedded secure element (eSE) is used to emulate a contactless card. Rather than involving a polling message, this example involves a message received following an anti-collision message sequence.

According to the MIFARE DESFire protocol, following an anti-collision message sequence, an application is selected by a message received from an external NFC device that designates a master file (MF), and a further message that designates a dedicated file (DF). In the example of FIG. 7, it is assumed that a first application is designated by the following MF and DF:

MF: 00 00 00
DF: 00 00 01 and a second application is designated by the following MF and DF:

MF: 00 00 00
DF: 00 00 02

Furthermore, it is assumed that the first application is executed by the UICC, and the second application is executed by the eSE. The instruction 0x5A means that an application is to be selected, the code 5A00000X meaning the application 00000X should be selected.

The table of FIG. 7 comprises five rows 702 to 710. The columns in the table of FIG. 7 are the same as those of FIG. 5 and will not be described again in detail. The RF technology indicated in the RF column is for example type A for each of the rows. The columns INDEX, PATTERN and MASK in the table for example designate: in rows 702 and 704, code that selects the MF 00 00 00; in row 706, code that selects the DF 00 00 01; in row 708, code that selects any file; and in row 710, code that selects the DF 00 00 02. The rule set required in rows 702, 706 and 708 of the table is 0x01, while the any rule set 0xXX can be active in rows 704 and 710 of the table. In the case that row 702, 706 or 708 is selected, the NFC router 202 is to process the message as being targeted to the UICC, whereas in the case that row 704 or 710 is selected, the NFC router is to process the message as being targeted to the eSE.

As with the table of FIG. 5, the table of FIG. 7 is applied by considering each row in turn from top down, in other words from row 702 to row 710, and selecting the first row for which all of the conditions are met.

It is assumed that a rule set 0x01 indicated in the table is a default rule set that is active following power up of the NFC router 202. A first frame following an anti-collision is received and the table is consulted, the MF 00 00 00 is for example selected. Row 702 of the table is thus selected, and the message is processed as being targeting to the UICC. For example, this means that the message is either routed to the UICC by the NFC router, and a response from the UICC is transmitted to the external device, or the NFC router directly responds to the external device in place of the assumed target.

The subsequent message from the external device may indicate that the DF 00 00 01 is selected, in which case the row 706 of the table is selected, and this message is processed as being targeted to the UICC.

Alternatively, the subsequent message from the external device may indicate that the DF 00 00 02 is selected, in which case the row 708 of the table is selected, given that the rule set 0x01 is active, and the message is processed as being targeted to the UICC. However, in the case of DF 00 00 02, the target host is not the UICC, but the eSE. Therefore, this message will be discarded and/or a response to the external device will be generated comprising an error code. Thus, in accordance with the DISABLE RULE column of row 708 of the table, the rule set 0x01 is disabled. The external device will then make a new attempt, and because the rule set 0x01 is disabled, a new frame designating the MF 00 00 00 will cause the row 704 of the table to be selected, such that the NFC router processes the message as being directed to the eSE. Furthermore, a subsequent frame designating the DF 00 00 02 will cause row 710 of the table to be selected, and thus again the NFC router will process the message as being directed to the eSE.

Figure 8:
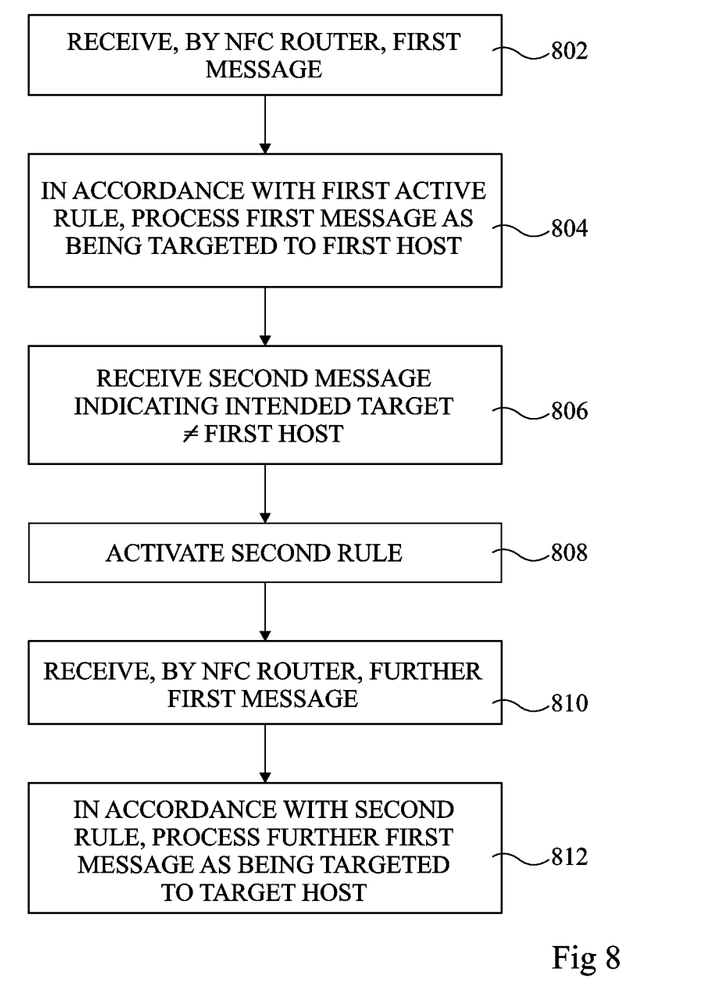
FIG. 8 is a flow diagram illustrating steps in a method of routing messages according to an example embodiment of the present disclosure.

FIG. 8 illustrates a method of routing, by an NFC router of a mobile device, messages to a target host processing device, such as the device host or a secure element of the mobile device.

In a first step 802, the NFC router receives a first message from an external NFC device. For example, this first message may correspond to the polling message of operation 604 of FIG. 6, or to a command received following an anti-collision sequence in the example of the table of FIG. 7 described above.

In a subsequent step 804, in accordance with a first active rule, the first message is processed by the NFC router as being targeted to a first host processing device, which is for example the main processor of the mobile device. For example, the NFC router either routes the first message to the first host processing device, or responds by emulating the response of the first host processing device. The first active rule corresponds for example to the rule defined by row 502 of the table of FIG. 5 or to the rule defined by row 702 of the table of FIG. 7, in which the rule set 0x01 is active.

In a subsequent step 806, a second message is received by the NFC router from the external NFC device, and the NFC router detects a bit pattern in the second message indicating that the first host processing device is not the intended target host of the second message. For example, in the embodiment of FIG. 5, the bit pattern is the fact that the instruction code does not start with the hexadecimal value D, and the NFC identifier is that of the host processing device. In the embodiment of FIG. 7, the pattern is a code starting with 0x5A, but not comprising the MF 00 00 00 or the DF 00 00 01.

In a subsequent step 808, a second routing rule is activated. This for example consists in simply deactivating the first rule set. For example, by deactivating the first rule set 0x01 and/or by activating another rule set in the tables of FIGS. 5 and 7, the rule defined by the rows 504 and 704 of these tables can be activated.

In a subsequent step 810, a further first message is received by the NFC router.

In a subsequent step 812, the further first message is processed by the NFC router as being directed to the target host processing device, which is for example a secure element of the mobile device, in accordance with the second active routing rule.

An advantage of the embodiments described herein is that NFC messages can be correctly routed to a target host while still routing messages by default to a host processing device, and while also respecting the requirement that only a single host device responds to the external device for a given NFC message sequence.

Having thus described at least one illustrative embodiment, various alterations, modifications and improvements will readily occur to those skilled in the art.

For example, while embodiments have been described with reference to a routing table, it will be apparent to those skilled in the art that there are other ways that the operations described herein could be implemented without using a routing table.

Furthermore, while the tables of FIGS. 5 and 7 provide one example of how routing rules can be applied according to embodiments of the present disclosure, it will be apparent to those skilled in the art that other implementation are possible, for example omitting the mask and/or index fields.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
one or more memories; and
processing circuitry, which, in operation:
responds to a first near field communication (NFC) message from an external NFC device by identifying a first processing device of a plurality of processing devices and processing the first NFC message based on the first identified processing device of the plurality of processing devices;
determines, based on bits of a second NFC message received from the external NFC device, whether the second NFC message was directed to the first identified processing device; and
when it is determined that the second NFC message was not directed to the first identified first processing device of the plurality of processing devices, responds to a third NFC message by identifying a second processing device of the plurality of processing devices and processing the third NFC message received from the external NFC device based on the second identified processing device, wherein the processing circuitry, in operation, responds to the first NFC message received from the external NFC device by applying a first processing rule, and, when it is determined that the second NEC message received from the external NFC device was not directed to the first identified processing device, responds to the third NFC message received from the external NFC device without applying the first processing rule.

2. The device of claim 1, comprising an NFC router including the processing circuitry.

3. The device of claim 1 wherein the memory stores a look-up table and the processing circuitry, in operation, identifies processing devices of the plurality of processing devices and determines whether the second NFC message was directed to the first identified processing device based on the look-up table.

4. The device of claim 1 wherein the first and third NFC messages received from the external NFC device are NFC polling messages.

5. The device of claim 1 wherein the plurality of processing devices comprise a host processor of a mobile device and at least one secure element of the mobile device.

6. The device of claim 1 wherein the processing circuitry, in response to said first NFC message, transmits a response message to said external NFC device.

7. The device of claim 6 wherein said response message comprises an identifier of the first identified processing device, and wherein said bits of the second NFC message comprise a combination in said second message of at least part of the identifier of said first processing device and of one or more bits indicating an NFC application type incompatible with said first processing device.

8. The device of claim 1 wherein the plurality of processing devices include a processing device which emulates a contactless integrated circuit card.

9. The device of claim 1 wherein said first NFC message is a polling messages of NFC RF transmission type F.

10. The device of claim 1 wherein the plurality of processing devices include at least one of a subscriber identification module (SIM) circuit and a universal SIM.

11. A system, comprising:
a plurality of processing devices; and
a near field communication router, which, in operation:
responds to a first near field communication (NFC) message from an external NFC device by identifying a processing device of the plurality of processing devices and processing the first NFC message based on the identified processing device of the plurality of processing devices;
determines, based on bits of a second NFC message received from the external NFC device, whether the second NFC message was directed to the identified processing device; and
responds to a third NFC message received from the external NFC device based on the determination, wherein the NFC router, in operation, responds to the first NFC message received from the external NEC device by applying a first processing rule, and, when it is determined that the second NFC message received from the external NFC device was not directed to the identified processing device, responds to the third NFC message received from the external NFC device without applying the first processing rule.

12. The system of claim 11, comprising a memory storing a look-up table, wherein the NFR router, in operation, determines whether the second NFC message was directed to the identified processing device based on the look-up table.

13. The system of claim 11 wherein the first and third NFC messages received from the external NFC device are NFC polling messages.

14. The system of claim 11 wherein the plurality of processing devices comprise a host processor of a mobile device and at least one secure element of the mobile device.

15. The system of claim 11 wherein,
when it is determined that the second NFC message was not directed to the identified processing device of the plurality of processing devices, the NFC router, in operation, identifies a second processing device of the plurality of processing devices and processes the third NFC message based on second identified processing device of the plurality of processing devices.

16. A non-transitory computer-readable memory medium whose contents cause a near field communication router to perform a method, the method comprising:
responding to a first near field communication (NFC) message from an external NFC device by identifying a processing device of a plurality of processing devices and processing the first NFC message based on the identified processing device of the plurality of processing devices;

determining, based on bits of a second NFC message received from the external NFC device, whether the second NFC message was directed to the identified processing device; and responding to a third NFC message received from the external NFC device based on the determination, wherein the method comprises responding to the first NFC message received from the external NEC device by applying a first processing rule, and, when it is determined that the second NFC message received from the external NFC device was not directed to the identified processing device, responding to the third NFC message received from the external NEC device without applying the first processing rule.

17. The medium of claim 16 wherein the determining whether the second NFC message was directed to the identified processing device is based on a look-up table.

18. The medium of claim 16 wherein when it is determined that the second NFC message was not directed to the identified processing device of the plurality of processing devices, the method comprises identifying a second processing device of the plurality of processing devices and processing the third NFC message based on second identified processing device of the plurality of processing devices.

19. A method, comprising:

responding, by a near field communication (NFC) router, to a first NFC message from an external NFC device by identifying a first processing device of a plurality of processing devices and processing the first NFC message based on the first identified processing device of the plurality of processing devices;

determining, by the NFC router and based on bits of a second NFC message received from the external NFC device, whether the second NFC message is directed to the first identified processing device; and when it is determined that the second NFC message was not directed to the first identified processing device of the plurality of processing devices, responding to a third NFC message by identifying a second processing device of the plurality of processing devices and processing the third NFC message received from the external NFC device based on the second identified processing device, wherein the method includes:

responding to the first NFC message received from the NFC device by applying a first processing rule; and when it is determined that the second NFC message received from the NFC device was not directed to the identified processing device, responding to the third NFC message received from the NFC device without applying the first processing rule.

20. The method of claim 19 wherein the determining whether the second NFC message is directed to the first identified processing device comprises accessing a look up table.

21. The method of claim 19 wherein the first and third NFC messages received from the external NFC device are NFC polling messages.

22. The method of claim 19 wherein the plurality of processing devices comprise a host processor of a mobile device and at least one secure element of the mobile device.

23. A method, comprising:

responding, using near field communication (NFC) circuitry, to a first NFC message from an NFC device by identifying a processing device of the plurality of processing devices and processing the first NFC message based on the identified processing device of the plurality of processing devices;

determining, using the NFC circuitry and based on bits of a second NFC message received from the NFC device, whether the second NFC message was directed to the identified processing device; and responding, using the NFC circuitry, to a third NFC message received from the NFC device based on the determination, wherein the method includes:

responding to the first NEC message received from the NEC device by applying a first processing rule; and when it is determined that the second NFC message received from the NFC device was not directed to the identified processing device, responding to the third NEC message received from the NFC device without applying the first processing rule.

24. The method of claim 23, comprising determining whether the second NFC message was directed to the identified processing device based on a look-up table.

25. The method of claim 23 wherein the first and third NFC messages received from the NFC device are NFC polling messages.

26. The method of claim 23 wherein the plurality of processing devices comprise a host processor of a mobile device and at least one secure element of the mobile device.

* * * * *

UNITED STATES PATENT AND TRADEMARK OFFICE
CERTIFICATE OF CORRECTION

PATENT NO. : 9,838,941 B2
APPLICATION NO. : 14/514868
DATED : December 5, 2017
INVENTOR(S) : Olivier Van Nieuwenhuyze Page 1 of 1

It is certified that error appears in the above-identified patent and that said Letters Patent is hereby corrected as shown below:

In the Claims

Column 13, Line 49:
"NEC" should read, --NFC--.

Column 14, Line 36:
"NEC" should read, --NFC--.

Column 15, Line 11:
"NEC" should read, --NFC--.

Column 15, Line 16:
"NEC" should read, --NFC--.

Column 16, Line 31:
"NEC" should read, --NFC--.

Column 16, Line 32:
"NEC" should read, --NFC--.

Column 16, Line 36:
"NEC" should read, --NFC--.

Signed and Sealed this
Twenty-third Day of October, 2018

Andrei Iancu
*Director of the United States Patent and Trademark Office*